United States Patent
Amirkalali

[19]

[11] Patent Number: 5,982,971
[45] Date of Patent: Nov. 9, 1999

[54] FLOATING FIBER STORAGE ASSEMBLY

[75] Inventor: Mohamad A. Amirkalali, Oceanport, N.J.

[73] Assignee: Tyco Submarine Systems Ltd., Morristown, N.J.

[21] Appl. No.: 08/728,647

[22] Filed: Oct. 10, 1996

[51] Int. Cl.⁶ ..................................................... G02B 6/36
[52] U.S. Cl. ............................................................ 385/135
[58] Field of Search ..................................... 385/134, 135

[56] References Cited

U.S. PATENT DOCUMENTS

| | | | |
|---|---|---|---|
| 5,450,518 | 9/1995 | Burek et al. | 385/135 |
| 5,479,553 | 12/1995 | Daems et al. | 385/135 |
| 5,509,099 | 4/1996 | Hermsen et al. | 385/134 |

FOREIGN PATENT DOCUMENTS

| | | | |
|---|---|---|---|
| 2150313 | 6/1985 | United Kingdom | 385/135 |
| WO 91/07680 | 5/1991 | WIPO | 385/135 |
| WO 01/08574 | 6/1991 | WIPO | 385/135 |

*Primary Examiner*—John Ngo
*Attorney, Agent, or Firm*—Mark K. Young

[57] ABSTRACT

A "floating" fiber storage assembly is provided for use with a fiber-optic cable joint that connects two or more cables. The device includes a fiber storage tray for storing the spliced optic fibers of the cables, although any fiber storage device (such as a cylinder) may be used. The fiber storage tray has a locking end with a connection interface, comprised of one or more locking cut-outs and locking tabs, for slidably engaging a terminating socket assembly. When the connection interface is slidably engaged with the terminating socket assembly, the fiber storage tray is loosely connected to the terminating socket assembly. To prevent the fiber storage tray and the terminating socket assembly from easily disengaging, a locking band may engage a substantially continuous locking groove formed when the storage tray and the socket assembly are loosely connected. A spacer device may be interposed between the fiber storage tray and the terminating socket assembly in order to reduce undesirable vibrations and noises, and to keep the two components separate and in their relative positions.

28 Claims, 7 Drawing Sheets

FLOATING FIBER STORAGE ASSEMBLY

FIELD OF THE INVENTION

The present invention relates to the field of submarine fiber-optic communications systems and, in particular, to a device for storing the optic fibers of fiber-optic cables connected at a cable joint.

BACKGROUND OF THE INVENTION

In our truly global society, more and more people are becoming interconnected with one another through telecommunications systems. Although submarine fiber-optic cable communications systems are but one type of telecommunication system, submarine fiber-optic cables are capable of carrying a greater number of data and voice transmissions than traditional submarine cable systems or modern satellite communication systems.

Stretching thousands of miles across the oceans, submarine fiber-optic cables lie on the ocean's floor, thousands of feet below sea level. Because no one cable could be made that extended thousands of miles in length, submarine fiber-optic cable communication systems are comprised of a series of submarine fiber-optic cables that are spliced together at cable joints. In this manner, many individual cables can be connected to form a single cable of the required length.

If one were to cut open a standard "nonarmored" fiber-optic cable, he would see that each cable is comprised of a series of optic fibers clustered around a steel "king" wire. Together, these wires form the fiber-optic "core" of the wire. The fiber-optic core is then surrounded by steel strength members and two watertight, insulating jackets (an inner copper jacket and an outer polyethylene jacket) encase the entire assembly. The function of the optic fibers is to carry the data and voice transmissions sent over the fiber-optic cable; the steel wires carry any loads placed upon the cable and, in conjunction with the insulating jackets, give the cable its rigidity. Because excess residual strain on the optic fibers may result in undesirable static fatigue and crack growth in the fibers, it is important that the amount of permanent load on the optic fibers (i.e., sustained loads over long periods of time) be minimized. Minimizing the amount of permanent load will prevent excess residual strain from developing in the optic fibers and thus will protect the fibers from damage. Accordingly, it is important that the optic fibers of a fiber-optic cable be protected against permanent loading and excess residual strain.

The cable joints themselves, however, are subject to a considerable amount of potentially harmful loads. For example, when the cable is first being lowered onto the ocean floor, a large tension load is created in the cable by the weight of the many thousands of feet of additional cable below it. In addition, once the cable reaches the desired location, the hydrostatic pressure at that depth can create upwards of 10,000 psi of compression on the cable joint. Because any one of these loads could result in an expensive failure in the fiber-optic cable communication system, it has always been a priority to design cable joints in such a way that when a load is placed upon one cable, the load can be successfully transferred to the other cable without putting stress on the interconnected optic fibers of the two cables.

Traditionally, cable joints were formed by "terminating" the two cables in separate terminating sockets and connecting the two terminating sockets with a load-bearing fiber storage tray or cylinder. The individual optic fibers were then spliced together and secured in the storage tray. The entire subassembly was then covered with a steel jacket and the entire assembly was "insulated" with heat-shrink insulation to keep it waterproof and electrically isolated.

Cable terminating technology is well-known in the prior art. The idea behind cable terminating is to secure the load-bearing steel members of a fiber optic cable, including both the steel strength members and the steel king wire, to a terminating socket assembly so that any load placed upon the steel members would be transferred to the terminating socket assembly. The fragile optic fibers of the cable, however, would completely pass through the terminating socket assembly.

Typically one terminates the steel strength members by first stripping off the cable's protective insulation, separating the strength members from the fiber-optic core, and slipping both the steel members and the core through the center of a terminating socket. A copper jacket and a steel plug is then placed over the core and the steel plug is firmly wedged into the terminating socket. In this way, the steel strength members are secured against the interior surface of the terminating socket while the fiber-optic core passes freely through the socket. To terminate the steel king wire, one merely needs to separate the individual optic fibers from the king wire and to attach the king wire to a king wire clamp assembly. The king wire clamp assembly is usually connected to the terminating socket (although it may be connected to a load-bearing fiber storage tray that is attached to the terminating socket) and together the terminating socket and the king wire clamp assembly form the terminating socket assembly. The end result of this process is that all load-bearing steel members of the fiber-optic cable are secured to the terminating socket assembly.

In a typical cable joint, a load-bearing fiber storage tray or cylinder connects the two terminating socket assemblies. This arrangement is intuitive because the fiber storage tray of a cable joint is in longitudinal alignment with both fiber-optic cables. Given these conditions, if one were to firmly attach the storage tray to both terminating socket assemblies, any force acting on one component of the assembly would act on all of the components. Thus, with this type of cable joint design, any load placed upon the first cable is transferred to its terminating socket assembly, through the fiber storage tray to the other terminating socket assembly, and ultimately to the other cable. The load-bearing fiber storage tray is usually connected to both terminating socket assemblies by means of screws, locking rings, or welds.

The disadvantage of this configuration, however, is that the load-bearing fiber storage tray or cylinder used in the cable joint must be of sufficient mass and strength to resist any loads that pass through it. Thus, such a component is usually quite bulky and made out of hardened steel. Furthermore, due to the strength that must be built into load-bearing fiber storage trays, fiber-to-fiber connections (i.e., two optic fibers spliced together) are usually stored on only one side of the tray; the structural integrity of the storage tray may be compromised if both sides of the tray are channeled out so as to accommodate traditional fiber-storing methods. Using only one side of the storage tray, however, decreases the total amount of fiber-to-fiber splices that can be stored in the fiber storage tray.

SUMMARY OF THE INVENTION

In light of the above, it is an object of the present invention to provide a "floating" fiber storage assembly for use with a submarine fiber-optic cable joint.

It is an additional object of the present invention to provide a fiber storage assembly for use with a fiber-optic cable joint that has one or more terminating socket assemblies, and wherein the fiber storage assembly slidably engages, and therefore is loosely connected to, the terminating sockets assemblies. By being loosely connected to the terminating socket assemblies while the position of the terminating socket assemblies remains fixed within the cable joint, the fiber storage tray of the fiber storage assembly is non-load-bearing (i.e., "floating").

It is a further object of the present invention to provide a fiber storage assembly for connecting the optic fibers of two cables wherein any load that is placed on one cable is transferred to the other cable without having the fiber storage assembly's fiber storage tray bear a substantial load.

Accordingly, it is an embodiment of the invention to provide a "floating" fiber storage assembly. The device includes a fiber storage tray for storing spliced optic fibers, although any fiber storage device (such as a cylinder) may be used. The fiber storage tray has a locking end with a connection interface, comprised of one or more locking cut-outs and locking tabs, for slidably engaging a terminating socket assembly. When the connection interface is slidably engaged with the terminating socket assembly, the fiber storage tray is loosely connected to the terminating socket assembly.

In the preferred embodiment of the invention, the locking tabs and one or more locking members of the terminating socket assembly define a substantially continuous locking groove. To prevent the fiber storage tray and the terminating socket assembly from easily disengaging, a locking band engages the groove. A spacer device interposed between the fiber storage tray and the terminating socket assembly keeps the two components separate and in their relative positions. When one or more spacer devices are used to position the fiber storage tray between two terminating socket assemblies, the spacer devices keep the fiber storage tray in a relatively fixed position in relation to the other two components.

Because of the unique design of the "floating" fiber storage assembly, little or no load passes through the fiber storage tray despite the fact that either of the cables connected to the cable joint may be carrying a load. Instead, the load is transferred from one cable to the other through alternate structures, such as through a steel casing that is fixed directly to each cable's terminating socket assembly.

Additional objects, advantages, embodiments, and novel features of the invention will be set forth in part in the description that follows, and in part will become apparent to those skilled in the art upon examination of the following or may be learned by practice of the invention.

BRIEF DESCRIPTION OF THE DRAWINGS

The invention will be more readily understood through the following detailed description, with reference to the accompanying drawings, in which.

DESCRIPTION OF THE PREFERRED EMBODIMENT

The present invention is a "floating" fiber storage assembly for use with a fiber-optic cable joint that connects two or more fiber-optic cables. Preferably, the fiber-optic cable joint has a steel casing or some other rigid structure that is capable of transferring any load that one cable places on the cable joint to another cable.

Figure 1:
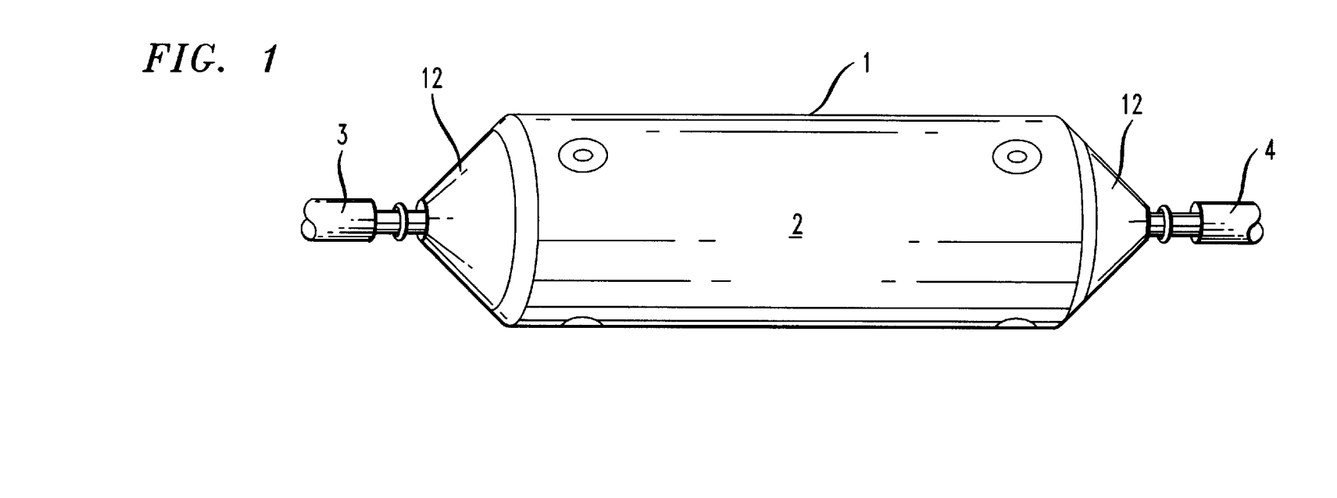
FIG. 1 is a perspective view of a submarine fiber-optic cable joint for use with the present invention.

As seen in FIG. 1, the present invention will be described in connection with a submarine fiber-optic cable joint 1 that has a steel casing 2 capable of carrying loads from one fiber optic cable 3 to another 4.

The present invention is designed to store and house the spliced optic fibers of the fiber-optic cables 3 and 4 to be connected. In the preferred embodiment of the invention, the spliced optic fibers of two 24-fiber fiber-optic cables are stored and housed in the present invention.

Figure 2:
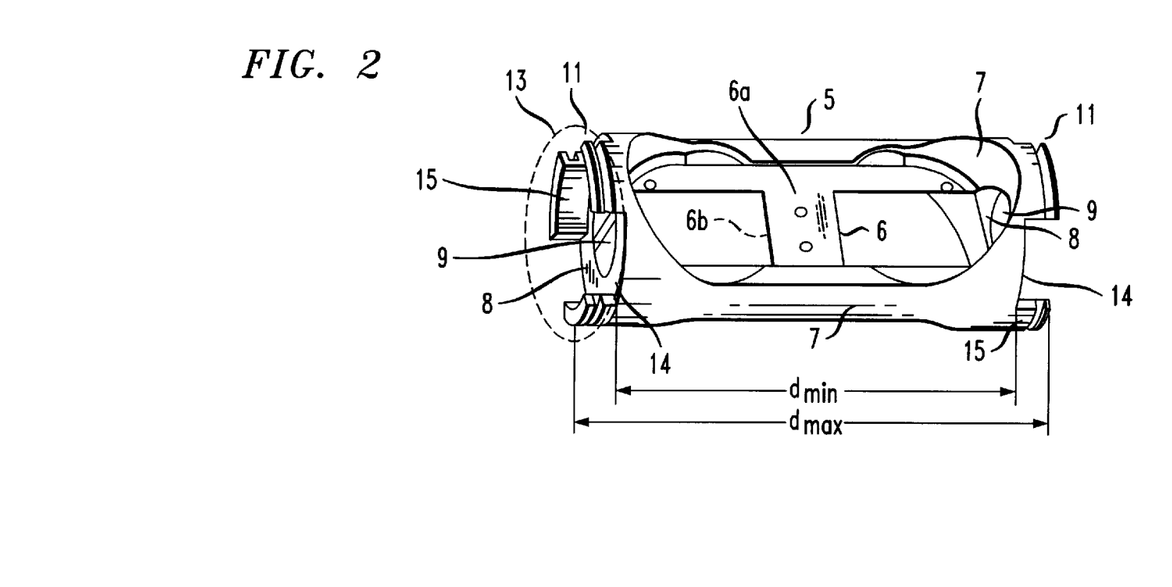
FIG. 2 is a perspective view of the preferred embodiment of the invention, shown without locking bands or spacer devices.
Figure 3:
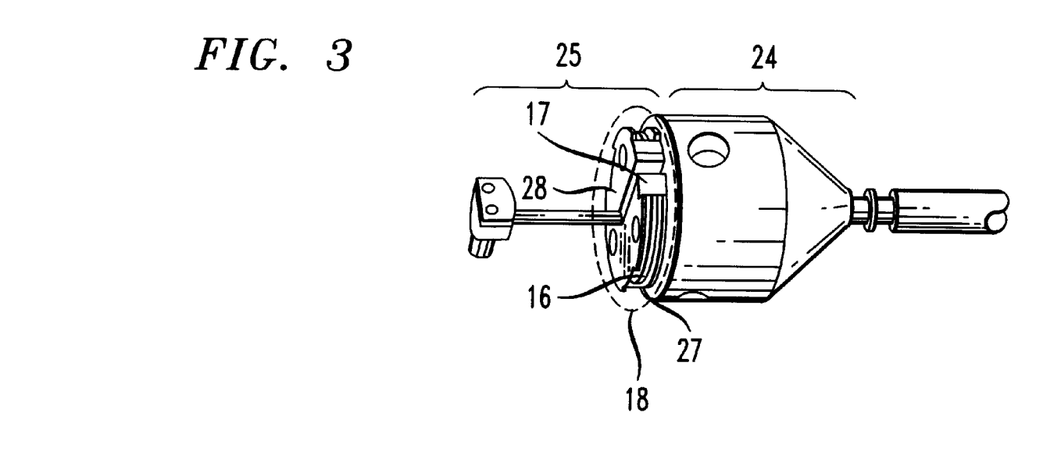
FIG. 3 is a perspective view of the preferred type of terminating socket assembly for use with the invention.

With reference to FIG. 2, the "floating" fiber storage assembly is comprised of a fiber storage tray 5, which has a floor 6, sides 7, and end walls 8. The optic fibers (not shown) of the cables 3 and 4 to be joined enter the fiber storage tray 5 by passing through an opening 9 in either end wall 8. Guide pins and fiber splice clips (not shown) may be attached to the fiber storage tray 5 to keep the individual optic fibers of each cable 3 or 4 separate. As optic fibers are extremely fragile, it is desirable that the fibers be kept separate so that fiber-on-fiber contact is avoided. Keeping the optic fibers separated also facilitates the making or repairing of the desired fiber-to-fiber connections (i.e., splices).

Because the fiber storage tray 5 of the present invention is designed to be non-load-bearing, the fiber storage tray 5 does not need to be as strong or as thick as traditional fiber storage trays. Although fiber storage trays have traditionally been made out of hardened steel, the non-load-bearing character of the fiber storage tray 5 used in the present invention enables it to be made out of aluminum (preferably) or molded plastic. In addition, the reduced thickness of the storage tray 5 allows the user of the device to store optic fibers and slices on both sides 6a and 6b of the floor 6. In the preferred embodiment of the invention, however, there is no need to use the lower surface 6b of the floor 6 because the 24 optic fibers contained in each cable 3 and 4 easily fit on the upper surface 6a of the floor 6. If the cables 3 and 4, however, each contained more than 24 optic fibers (i.e., 48 each), it may be preferable to use both sides 6a and 6b of the floor 6 of the fiber storage tray 5 to store the spliced optic fibers.

The fiber storage tray 5 of the present invention has at least one locking end 11 for connecting the fiber storage tray 5 to a terminating socket assembly 12. Terminating socket assemblies 12 are the components wherein the load-bearing members of the fiber-optic cables 3 and 4 are "terminated," thereby ensuring that any load placed on a cable 3 or 4 is transferred to the corresponding terminating socket assembly 12. If any component were to be firmly connected to both terminating socket assemblies 12, it would naturally follow that any load placed on a cable 3 or 4 would be transferred from one terminating socket assembly 12 to the other through the firmly connected component.

For this reason, it is preferable that the present invention be used in conjunction with a cable joint 1 wherein a steel casing 2 is the only component firmly connected to both terminating socket assemblies 12. The fiber storage tray 5, in contrast, is not firmly connected to the terminating socket assemblies 12. Although the fiber storage tray could be connected to a single terminating socket assembly 12 and still be considered "floating" (i.e., non-load-bearing), in the preferred embodiment of the invention the fiber storage tray 5 is loosely connected to both terminating socket assemblies 12 and thereby "floats" between them and has two locking ends 11.

The fiber storage tray 5 is connected to the terminating socket assemblies 12 at its locking ends 11. Each locking end 11 has a connection interface 13 for loosely engaging the terminating socket assemblies 12. In the preferred embodiment of the invention, each connection interface is comprised of three locking cut-outs 14 and three locking tabs 15, although the exact number of cut-outs 14 and tabs 15 is not critical. The purpose of a connection interface 13 is to engage a terminating socket assembly 12 in such a manner as to loosely connect the fiber storage tray 5 to the terminating socket assembly 12. Therefore, as one skilled in this art would appreciate, there are any number of possible configurations for the connection interfaces 13.

Figure 4:
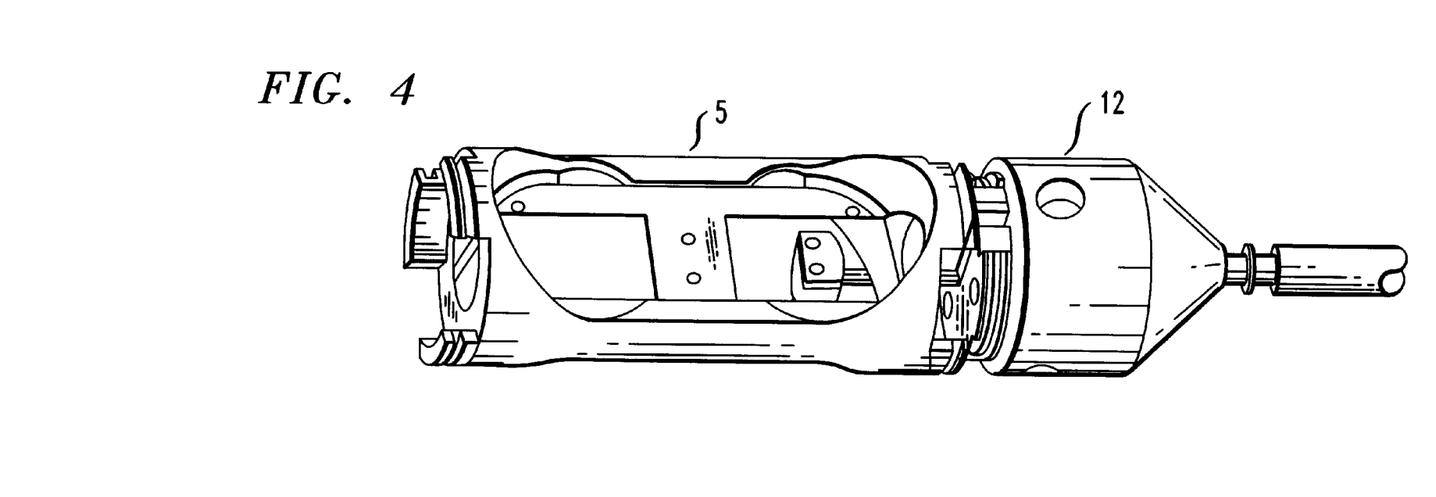
FIG. 4 is a perspective view of the preferred embodiment of the invention, shown without locking bands or spacer devices, slidably engaging the terminating socket assembly.
Figure 5:
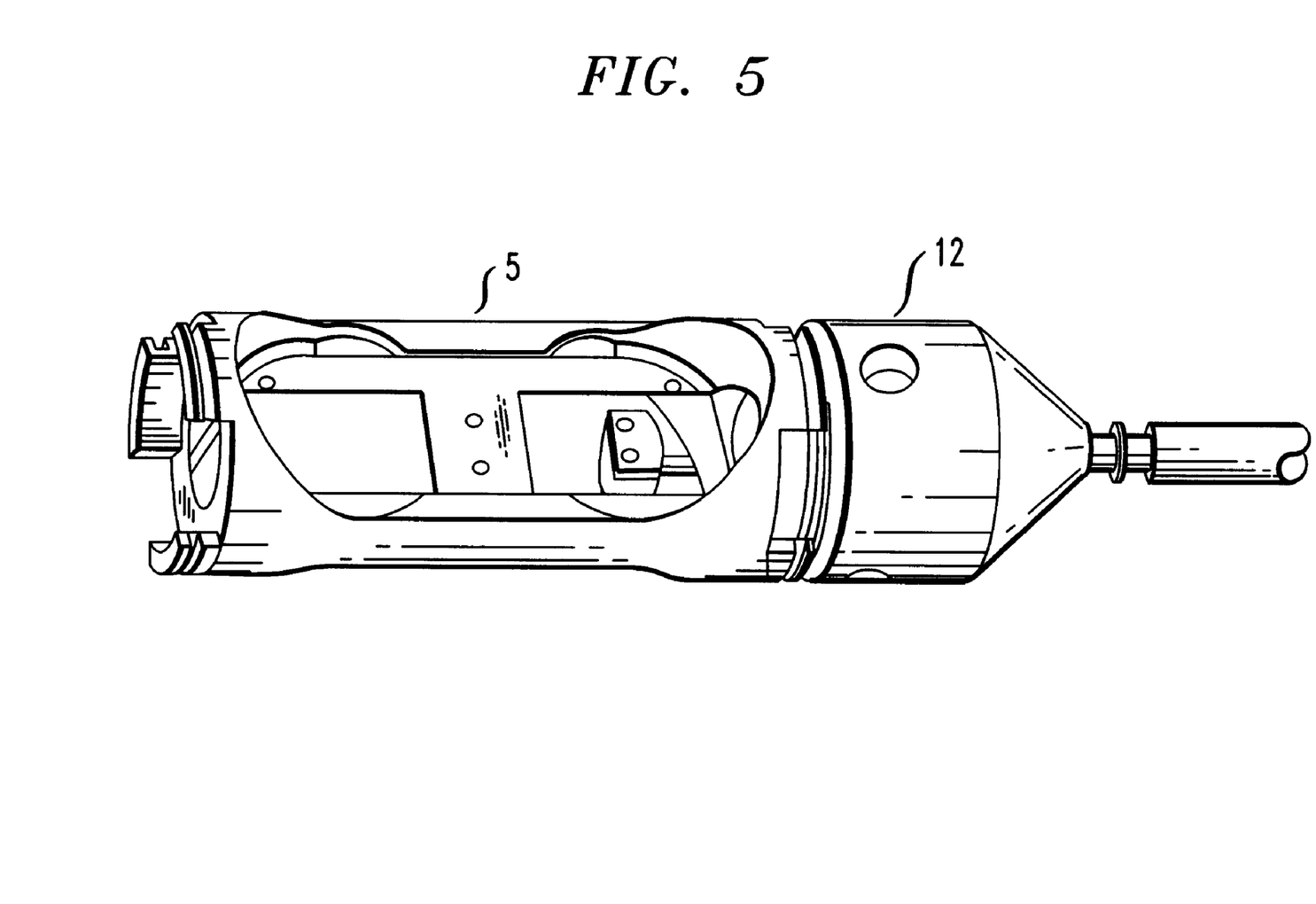
FIG. 5 is a perspective view of the preferred embodiment of the invention, shown without locking bands or spacer devices, loosely connected to the terminating socket assembly.

The connection interface 13 of the preferred embodiment of the invention is designed to slidably engage the terminating socket assemblies 12 (shown in FIGS. 4 and 5). In particular, the locking cut-outs 14 and locking tabs 15 of the connection interface 13 are designed to longitudinally engage a corresponding locking member 16 or locking channel 17 of the terminating socket assembly 12. Together, the locking members 16 and the locking channels 17 of a terminating socket assembly 12 comprise the connection interface 18 of that terminating socket assembly 12.

In the preferred embodiment of the invention, the connection interface 18 of the terminating socket assembly 12 has three locking members 16 and three locking channels 17. In addition, the connection interface 13 of the fiber storage tray 5 is 60 degrees out of phase with the connection interface 18 of the terminating socket assembly 12. Because the connection interfaces 13 and 18 have been arranged in this manner, when the fiber storage tray 5 and the terminating socket assemblies 12 are pushed together to be joined, the locking tabs 15 slidably engage the locking channels 17 and the locking members 16 slidably engage the locking cut-outs 14 Thus, the connection interfaces 13 and 18 function together as dual "lock and key" mechanisms or loosely connecting the fiber storage tray 5 to the terminating socket assembly 12.

The process by which the fiber storage tray 5 is loosely connected to the terminating socket assemblies 12 is to first slidably engage the fiber storage tray 5 to one terminating socket assembly 21, and then to slidably engage the other terminating socket assembly 12 to the other end of the fiber storage tray 5. After the components have been loosely connected (and the optic fibers have been properly connected and spliced), a casing 2 or some other sturdy structure covers the entire subassembly and is secured to the terminating socket assemblies 12.

Because the position of the terminating socket assemblies 12 has been fixed in relation to the casing 2, the distance between the end walls 27 of the terminating sockets 24, and the distance between the end walls 28 of the terminating socket assemblies 12, are both likewise fixed. With respect to the fiber storage tray 5, the maximum length of the storage tray 5 is $d_{MAX}$ and the distance between the outside surfaces of the end walls 8 of the storage tray 5 is $d_{MIN}$ (see FIG. 2).

To ensure a loose connection between the fiber storage tray 5 and the terminating socket assemblies 12, the distance between the end walls 27 of the terminating sockets 24 is slightly larger than $d_{MAX}$ and the distance between the end walls 28 of the terminating socket assemblies 12 is slightly larger than $d_{MIN}$. Also, the width of the locking cut-outs 14 is slightly greater than the width of the locking members 16, the width of the locking tabs 15 is slightly less than the width of the locking channels 17, and the length of the locking members 16 is slightly less than the depth of the locking cut-outs 14.

It is desirable, however, that once the terminating socket assemblies 12 and the fiber storage tray 5 are assembled, they remain so. Thus, in order to make sure that the fiber storage tray 5 and the terminating socket assemblies 12 remain loosely connected and do not disengage, the distance between the end walls 28 of the terminating socket assemblies 12 is less than $d_{MAX}$.

Figure 6:
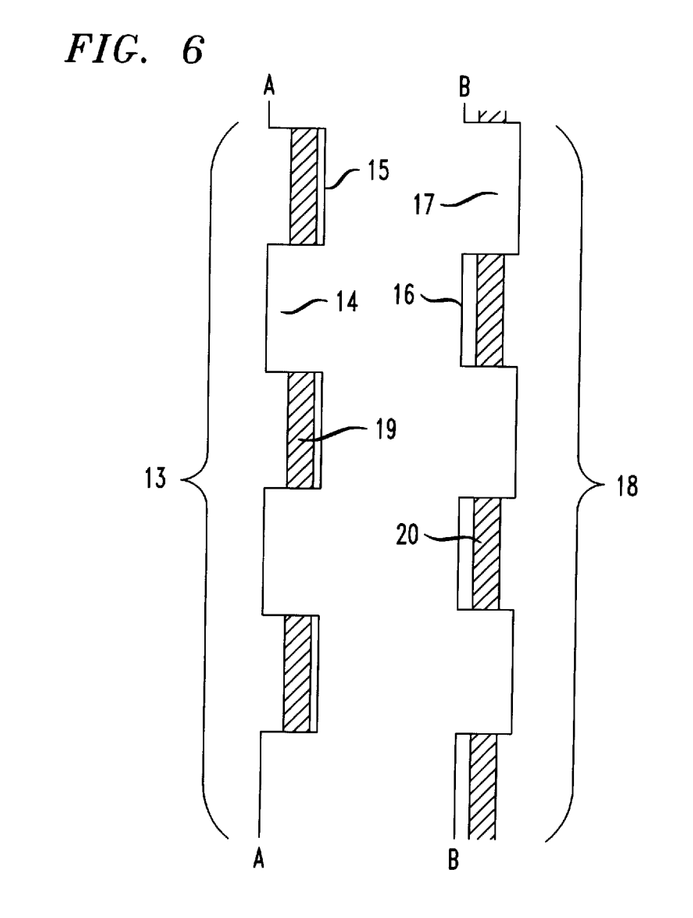
FIG. 6 is a planar projection of the connection interface of the invention slidably engaging the terminating socket assembly.

In the preferred embodiment of the invention, the connection interface 13 of the fiber storage tray 5 and the connection interface 18 of a terminating socket assembly 12 are both annular. Thus, if one were to make a two-dimensional planar projection of the surface area of the connection interfaces 13 and 18, the image would be similar to that illustrated in FIG. 6. As is clearly shown in FIG. 6, each locking tab 15 defines a locking groove 19 and each locking member 16 defines a similarly configured locking groove 20. When the locking end 11 of the fiber storage tray 5 is loosely connected with a terminating socket assembly 12, the locking tabs 15 loosely engage a corresponding locking channel 17 and the locking members 16 loosely engage a corresponding locking cut-out 14. A planar projection of this arrangement is shown in FIG. 7.

Figure 8:
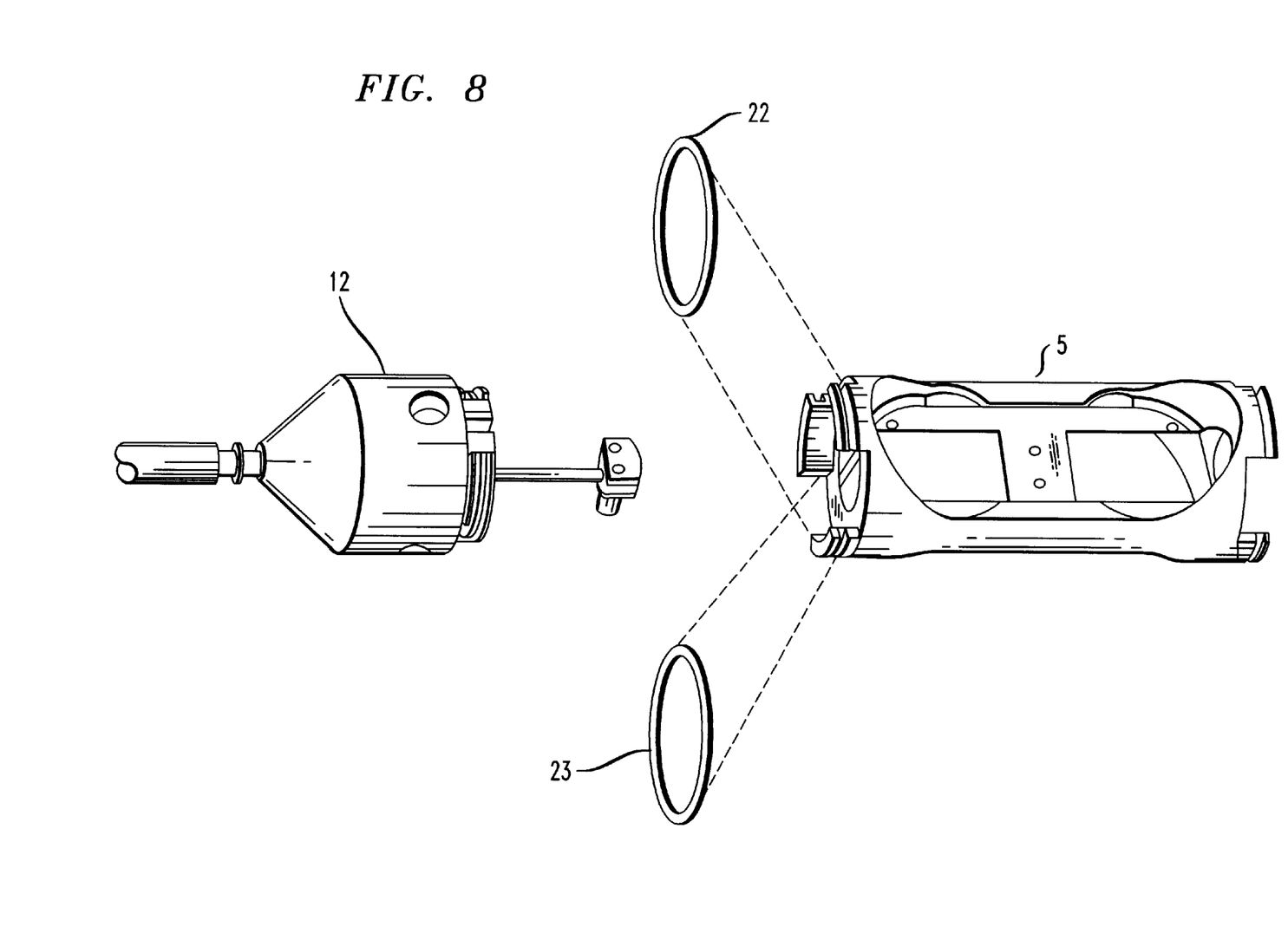
FIG. 8 is a perspective view of the preferred embodiment of the invention slidably engaging the terminating socket assembly, showing the position of the locking band and the spacer device.

When the two connection interfaces 13 and 18 are loosely connected, the locking grooves 19 and the locking grooves 20 become roughly aligned and form a substantially continuous locking groove 21. A locking band 22 may be used to engage the substantially continuous locking groove 21 and therefore prevent the fiber storage tray 5 and the terminating socket assembly 12 from easily disengaging after they have been loosely connected. By preventing the components from easily disengaging, the locking band 22 makes it easier to connect the disclosed fiber storage assembly to both terminating socket assemblies 12, especially when such work is being done aboard a moving ship. The position of the locking band 22 is illustrated in FIG. 8. In the preferred embodiment of the invention, a rubber O-ring is used as the locking band 22.

Figure 7:
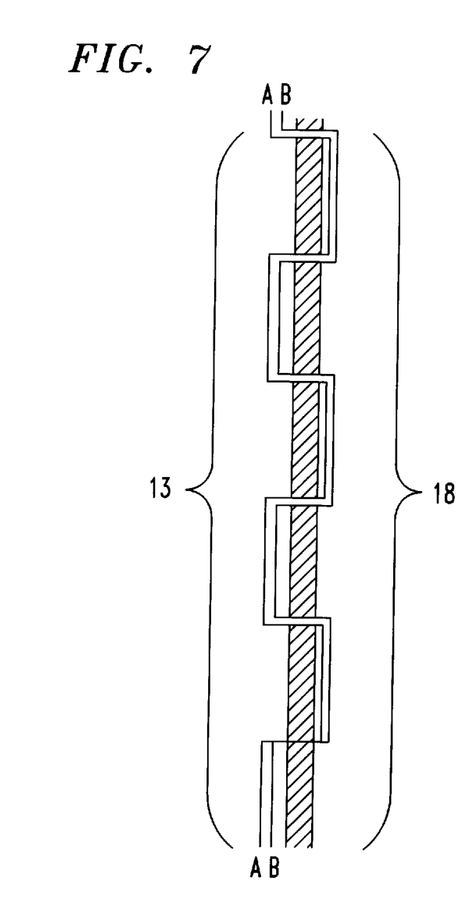
FIG. 7 is a planar projection of the connection interface of the invention loosely connected to the terminating socket assembly.

As can be seen in FIG. 7, when the fiber storage tray 5 is loosely connected to the terminating socket assembly 12, some degree of separation generally exists between the two connection interfaces 13 and 18. This separation, coupled with the fact that both terminating socket assemblies are fixed within the cable joint 1 (i.e., by being secured to the steel casing 2) ensures that the fiber storage tray 5 is never firmly connected to both terminating socket assemblies 12 and, therefore, that it never carries a load. At the same time, however, if a force is applied to the cable joint 1, the fiber storage tray 5 may move longitudinally in relation to the terminating socket assemblies 12, although never to such an extent that the fiber storage tray 5 might disengage from one of the terminating socket assemblies 12. The free (albeit slight) movement of the fiber storage tray 5 with the cable joint 1, however, is not a desirable trait; motion can create unwanted noises and internal stresses within the joint 1.

Although the locking band 22 restricts some of the longitudinal movement of the fiber storage tray 5 in relation to a terminating socket assembly 12, a spacer device 23 is provided in the present invention to ensure a separation between the two components and to restrict the longitudinal motion of the fiber storage tray 5. In essence, the spacer device 23, which is interposed between the fiber storage tray 5 and any terminating socket assembly 12 to which the storage tray 5 is loosely connected, makes the "loose" connection between the fiber storage tray 5 and the terminating socket assembly 12 more "snug." Use of the spacer device 23 however, does not alter the fact that the fiber storage tray 5 is loosely connected to the terminating socket assembly 12 and that it is non-load-bearing. In effect, the spacer device 23 serves as a deformable cushion to keep the fiber storage tray 5 in its proper position between the two terminating socket assemblies 12. When the cable joint 1 is completely assembled, it is preferable that the spacer device 23 be slightly compressed between the fiber storage tray 5 and the terminating socket assembly 12.

As seen in FIG. 8, the spacer device 23 is designed to be placed on (or secured to) the exterior surface of an end wall 8 of the fiber storage tray 5. In this position, the spacer device 23 is interposed between the fiber storage tray 5 and the terminating socket assembly 12. On the end wall 8, the spacer device is positioned around the opening 9, but beneath the locking tabs 15 (i.e., within the area defined by the lower surfaces of the locking tabs 15). In the preferred embodiment of the invention, each spacer device 23 is a rubber O-ring.

Figure 9:
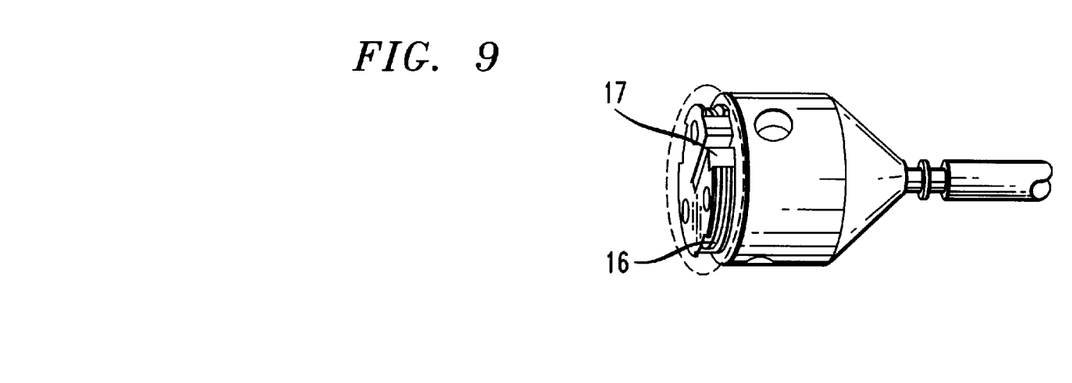
FIG. 9 is a perspective view of an alternate type of terminating socket assembly for use with the invention.
Figure 10:
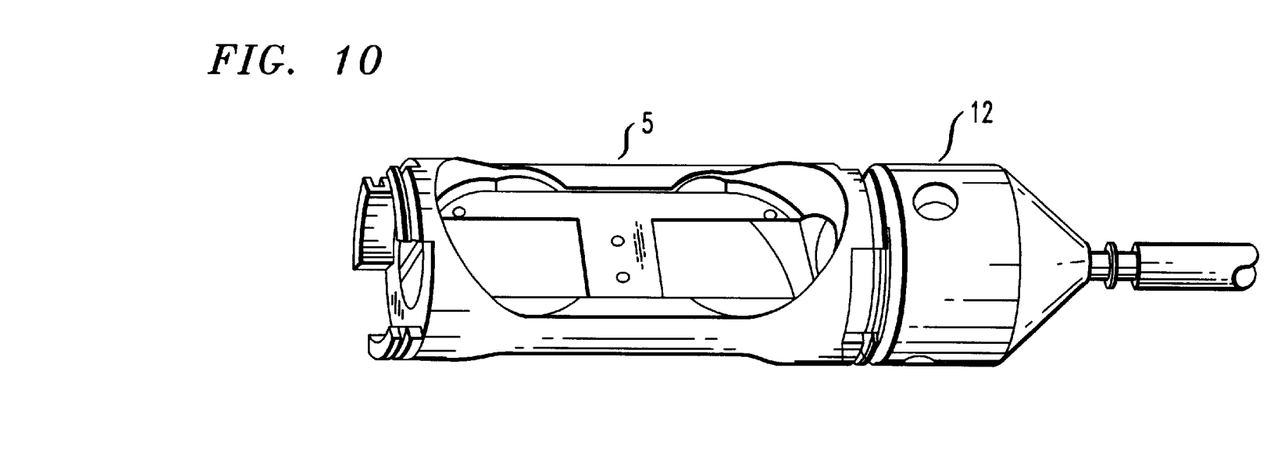
FIG. 10 is a perspective view of the preferred embodiment of the invention, shown without locking bands or spacer devices, loosely connected to the alternate type of terminating socket assembly.
Figure 11:
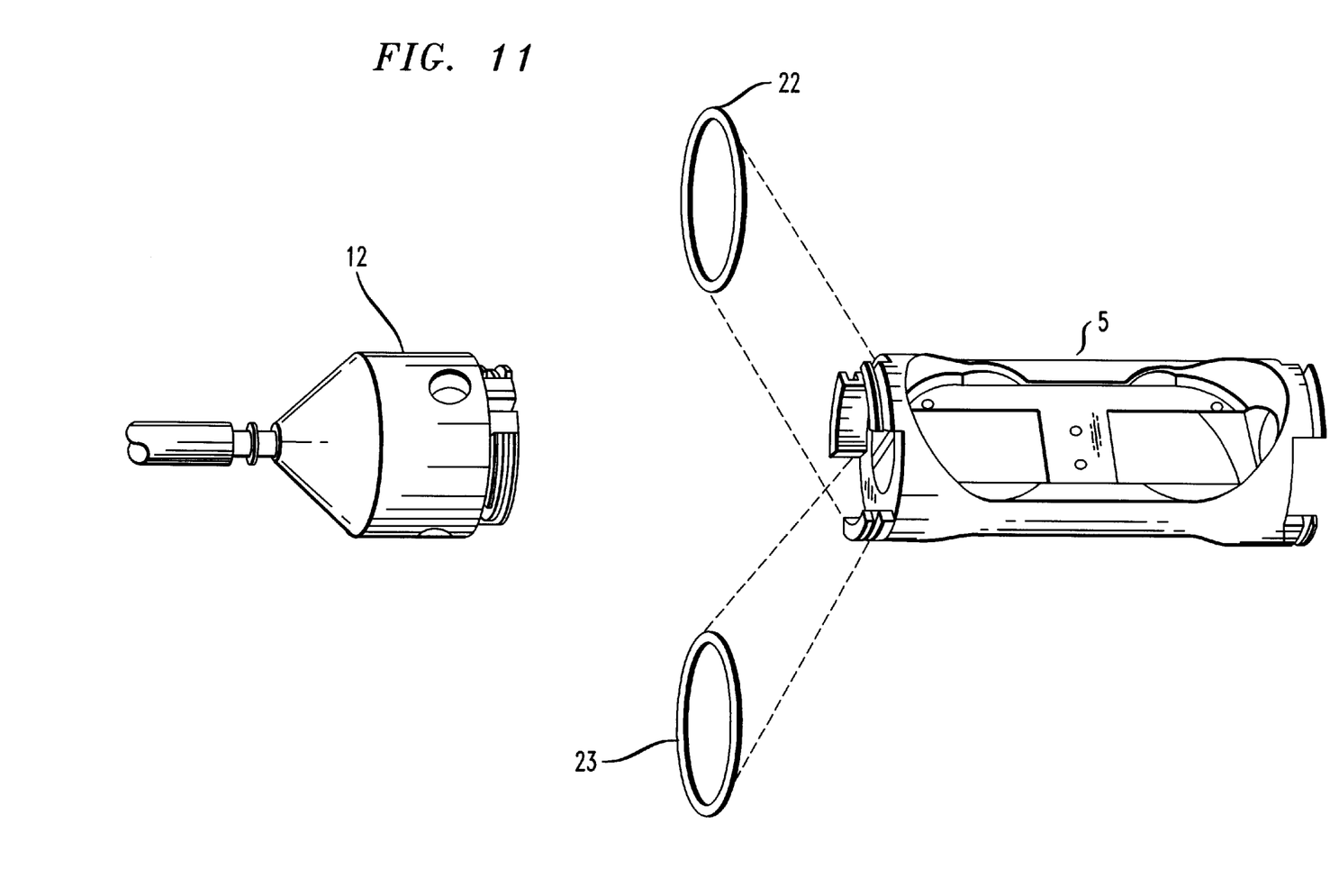
FIG. 11 is a perspective view of the preferred embodiment of the invention slidably engaging the alternate type of terminating socket assembly, showing the position of the locking band and the spacer device.

Although the present invention has been discussed in the context of having the fiber storage tray 5 be loosely connected to both terminating socket assemblies 12, the disclosed fiber storage assembly could easily be firmly connect to one terminating socket assembly 12 while being loosely connected to the other. In this manner, the fiber storage tray 5 would still "float" between the two terminating socket assemblies 12 because no load would pass from one socket assembly 12 to the other through the fiber storage tray 5; it would pass through a casing 2 or some other structure instead. Likewise, the terminating socket assemblies 12 used in connection with the preferred embodiment of the invention are comprised of terminating sockets 24 and king wire clamp assemblies 25; a configuration used if the fiber-optic cables 3 and 4 have king wires. Alternately, however, an end plate assembly 26 may be used if the fiber-optic cables 3 and 4 do not have king wires or if a king wire clamp assembly 25 is otherwise unnecessary. This alternate configuration is shown in FIGS. 9–11.

Furthermore, although a fiber storage tray 5 is used in conjunction with this invention, alternate embodiments of the invention may include using fiber storage cylinders or "loose-fit" storage means for storing the spliced optic fibers, provided the storage device was "floated" between the terminating socket assemblies 12.

Still other objects and advantages of the present invention will become readily apparent to those skilled in this art from the above-recited detailed description, wherein only the preferred embodiment of the invention has been shown and described. The description of the preferred embodiment is simply by way of illustration of the best mode contemplated for carrying out the invention. As will be realized, the invention is capable of other and different embodiments, and its several details are capable of modification in various respects, all without departing from the invention. Accordingly, the drawings and descriptions are to be regarded as illustrative in nature, and not as restrictive.

I claim:

1. A fiber storage assembly for use with a fiber-optic cable joint, said fiber storage assembly comprising:

a. a fiber storage tray for storing spliced optic fibers;

b. a locking end of said fiber storage tray for loosely connecting said fiber storage tray to a terminating socket assembly;

c. a connection interface of said locking end, said connection interface having a locking cut-out and a locking tab;

d. wherein said connection interface loosely connects said locking end of said fiber storage tray to said terminating socket assembly by slidably engaging said terminating socket assembly.

2. The device as recited in claim 1, wherein said locking tab defines a locking groove.

3. The device as recited in claim 2, wherein when said connection interface is slidably engaged with a terminating socket assembly having a locking member with a locking groove, said locking groove of said locking tab and said locking groove of said locking member form a substantially continuous locking groove.

4. The device as recited in claim 3, wherein said substantially continuous locking groove is annular.

5. The device as recited in claim 3, further comprising:

a locking band for engaging said substantially continuous locking groove, wherein said locking band restricts the movement of said fiber storage tray with respect to said terminating socket assembly.

6. The device as recited in claim 1, further comprising:

a spacer device interposed between said fiber storage tray and said terminating socket assembly, said spacer device for ensuring a separation distance between said fiber storage tray and said terminating socket assembly.

7. The device as recited in claim 6, wherein said spacer device restricts the longitudinal motion of said fiber storage tray.

8. The device as recited in claim 6, wherein said spacer device retains said fiber storage tray in a relatively fixed position with respect to said terminating socket assembly and a second terminating socket assembly.

9. A fiber storage assembly for use with a terminating socket assembly having a locking member and a locking channel, comprising:

a fiber storage tray for storing spliced optic fibers;

a locking end of said fiber storage tray;

a connection interface of said locking end for loosely coupling said fiber storage tray to said terminating socket assembly;

a locking cut-out of said connection interface sized to receive said locking member; and a locking tab of said connection interface sized to slidably engage said locking channel.

10. The device as recited in claim 9, wherein said locking tab defines a locking groove.

11. The device as recited in claim 10, wherein said locking tab and said locking member define a substantially continuous locking groove when said fiber storage tray is loosely coupled to said terminating socket assembly.

12. The device as recited in claim 10, wherein said locking tab and said locking member define a substantially continuous annular locking groove when said fiber storage tray is loosely coupled to said terminating socket assembly.

13. The device as recited in claim 11, further comprising a locking band for engaging said substantially continuous locking groove such that the movement of said fiber storage tray with respect to said terminating socket assembly is restricted.

14. The device as recited in claim 9, further comprising a spacer device interposed between said fiber storage tray and said terminating socket assembly.

15. The device as recited in claim 9, further comprising means for restricting the longitudinal motion of said fiber storage tray with respect to said terminating socket assembly.

16. The device as recited in claim 9, further comprising means for ensuring a separation distance between said fiber storage tray and said terminating socket assembly.

17. A fiber storage assembly for use with a terminating socket assembly, comprising:
   a fiber storage tray for storing spliced optic fibers;
   a locking end of said fiber storage tray;
   a connection interface of said locking end for loosely coupling said fiber storage tray to said terminating socket assembly; and
   wherein said connection interface loosely connects said locking end of said fiber storage tray to said terminating socket assembly.

18. The device as recited in claim 17, further comprising a spacer device interposed between said fiber storage tray and said terminating socket assembly.

19. The device as recited in claim 17, further comprising means for restricting the longitudinal motion of said fiber storage tray with respect to said terminating socket assembly.

20. The device as recited in claim 17, further comprising means for ensuring a separation distance between said fiber storage tray and said terminating socket assembly.

21. The device as recited in claim 17, wherein said terminating socket assembly has a locking member, and said connection interface has a locking cut-out sized to receive said locking member.

22. The device as recited in claim 17, wherein said terminating socket assembly has a locking channel, and said connection interface has a locking tab sized to slidably engage said locking channel.

23. A fiber storage assembly for use with a terminating socket assembly having a plurality of locking members and a plurality of locking channels, comprising:
   a fiber storage tray for storing spliced optic fibers;
   a locking end of said fiber storage tray, said locking end having an end wall;
   a connection interface of said locking end for loosely coupling said fiber storage tray to said terminating socket assembly;
   a plurality of locking cut-outs of said connection interface, each locking cut-out of said plurality of locking cut-outs being sized to receive one of said plurality of locking members; and
   a plurality of locking tabs of said connection interface, one or more of said plurality of locking tabs extending beyond said end wall, and each locking tab of said plurality of locking tabs being sized to slidably engage one of said plurality of locking channels.

24. The device as recited in claim 23, further comprising a spacer device interposed between said fiber storage tray and said terminating socket assembly.

25. A fiber storage assembly for use with a first terminating socket assembly having a first plurality of locking members and a first plurality of locking channels, and a second terminating socket assembly having a second plurality of locking members and a second plurality of locking channels, comprising:
   a fiber storage tray for storing spliced optic fibers;
   a first locking end of said fiber storage tray;
   a second locking end of said fiber storage tray;
   a first connection interface of said first locking end for loosely coupling said fiber storage tray to said first terminating socket assembly;
   a second connection interface of said second locking end for loosely coupling said fiber storage tray to said second terminating socket assembly;
   a first plurality of locking cut-outs of said first connection interface, each locking cut-out of said first plurality of locking cut-outs being sized to receive one of said first plurality of locking members of said first terminating socket assembly;
   a second plurality of locking cut-outs of said second connection interface, each locking cut-out of said second plurality of locking cut-outs being sized to receive one of said second plurality of locking members of said second terminating socket assembly;
   a first plurality of locking tabs of said first connection interface, each locking tab of said first plurality of locking tabs being sized to slidably engage one of said first plurality of locking channels;
   a second plurality of locking tabs of said second connection interface, each locking tab of said second plurality of locking tabs being sized to slidably engage one of said second plurality of locking channels;
   wherein said first connection interface loosely connects said first locking end of said fiber storage tray to said first terminating socket assembly by slidably engaging said first terminating socket assembly; and
   wherein said second connection interface loosely connects said second locking end of said fiber storage tray to said second terminating socket assembly by slidably engaging said second terminating socket assembly.

26. The device as recited in claim 25, further comprising a first spacer device interposed between said first locking end and said first terminating socket assembly, and a second spacer device interposed between said second locking end and said second terminating socket assembly.

27. The device as recited in claim 25, further comprising means for restricting the longitudinal motion of said fiber storage tray between said first terminating socket assembly and said second terminating socket assembly.

28. The device as recited in claim 25, further comprising means for ensuring a separation distance between said first locking end and said first terminating socket assembly, and between said second locking end and said second terminating socket assembly.

* * * * *